(12) United States Patent
Farhadi et al.

(10) Patent No.: US 12,224,841 B2
(45) Date of Patent: Feb. 11, 2025

(54) LINK ADAPTATION FOR SPATIAL MULTIPLEXING

(71) Applicant: Telefonaktiebolaget LM Ericsson (publ), Stockholm (SE)

(72) Inventors: Hamed Farhadi, Stockholm (SE); Ulf Gustavsson, Gothenburg (SE); Sven Jacobsson, Västra Frölunda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 475 days.

(21) Appl. No.: 17/618,341

(22) PCT Filed: Jun. 12, 2019

(86) PCT No.: PCT/SE2019/050557
§ 371 (c)(1),
(2) Date: Dec. 10, 2021

(87) PCT Pub. No.: WO2020/251436
PCT Pub. Date: Dec. 17, 2020

(65) Prior Publication Data
US 2022/0231750 A1     Jul. 21, 2022

(51) Int. Cl.
*H04B 7/0452* (2017.01)
*H04B 7/0456* (2017.01)
(Continued)

(52) U.S. Cl.
CPC ........ *H04B 7/0697* (2013.01); *H04B 7/0456* (2013.01); *H04B 7/063* (2013.01);
(Continued)

(58) Field of Classification Search
None
See application file for complete search history.

(56) References Cited

U.S. PATENT DOCUMENTS 8,644,368 B1 *  2/2014  Zhang ............... H04B 7/0456
                                                         455/39
2013/0343290 A1  12/2013  Ren et al.
(Continued)

FOREIGN PATENT DOCUMENTS

| CN | 102523077 A * | 6/2012 |
| WO | 2015/095844 A1 | 6/2015 |
| WO | 2020/126016 A1 | 6/2020 |

OTHER PUBLICATIONS

International Search Report and Written Opinion dated Mar. 31, 2020 in International Application No. PCT/SE2019/050557 (12 pages total).
(Continued)

*Primary Examiner* — The Hy Nguyen
(74) *Attorney, Agent, or Firm* — Rothwell, Figg, Ernst & Manbeck, P.C.

(57) ABSTRACT

A link adaptation method is disclosed for a transmitter node configured for spatial multiplexing of signals into streams and for transmission of spatially multiplexed streams over a forward channel, wherein each stream is intended for a receiver node. The method comprises selecting a transmission pre-coding setting for at least one of the spatially multiplexed streams based on an acquired channel estimate of the forward channel, estimating a forward channel disturbance component, wherein the forward channel disturbance component includes signal distortion for the forward channel caused by at least one hardware component of the transmitter node and/or the receiver node, and performing link adaptation for at least one of the spatially multiplexed streams based on the selected transmission pre-coding setting and the estimated forward channel disturbance component. Corresponding apparatus, transmitter node and computer program product are also disclosed.

16 Claims, 2 Drawing Sheets

(51) Int. Cl.
*H04B 7/06* (2006.01)
*H04L 1/00* (2006.01)

(52) U.S. Cl.
CPC .......... *H04L 1/0003* (2013.01); *H04L 1/0009* (2013.01); *H04L 1/0023* (2013.01); *H04B 7/0452* (2013.01)

(56) References Cited

U.S. PATENT DOCUMENTS

2016/0365907 A1* 12/2016 Oyman ................ H04L 1/0019
2018/0316367 A1* 11/2018 Johansson ............ H04B 1/0475
2019/0089431 A1    3/2019 Zhu et al.
2019/0326959 A1* 10/2019 Davydov ............. H04B 7/0469

OTHER PUBLICATIONS

Jacobsson, Sven et al., "Massive MU-MIMO-OFDM Uplink with Hardware Impairments: Modeling and Analysis", IEEE, Conference Proceedings Article, Jan. 8, 2019 (7 pages total).

Aghdam, Sina Rezaei, "Distortion-Aware Linear Precoding for Millimeter-Wave Multiuser MISO Downlink", 2019 IEEE International Conference on Communications Workshops, ICC Workshops 2019 Proceedings, May 1, 2019 (6 pages total).

3GPP TS 22.011 V14.4.0, Dec. 2016, 3rd Generation Partnership Project; Technical Specification Group Services and System Aspects; Service accessibility (Release 14) (30 pages total).

Rico-Alvariño, A. et al., "Learning-Based Adaptive Transmission for Limited Feedback Multiuser MIMO-OFDM", 1 IEEE Transactions on Wireless Communications, vol. 13, No. 7, Jul. 2014, XP011553200, 3806-3820 (15 pages).

* cited by examiner

LINK ADAPTATION FOR SPATIAL MULTIPLEXING

CROSS REFERENCE TO RELATED APPLICATION

This application is a 35 U.S.C. § 371 National Stage of International Patent Application No. PCT/SE2019/050557, filed Jun. 12, 2019.

TECHNICAL FIELD

The present disclosure relates generally to the field of wireless communication. More particularly, it relates to link adaptation for spatial multiplexing in wireless communication.

BACKGROUND

Link adaptation may typically comprise determining a coding and modulation scheme (MCS) for a transport block. The determination is typically based on channel quality and aim to accomplish a target decoding error probability at the receiver. Link adaptation is an important part of spatial multiplexing approaches; single-user (SU) multiple-input multiple-output (MIMO) systems, as well as multi-user (MU) MIMO systems.

In a typical SU-MIMO approach, the receiver (e.g., a user equipment—UE) estimates the channel quality and reports an indication thereof to the transmitter (e.g., a base station—BS, eNB). The transmitter typically applies the indication of the receiver directly when determining MCS.

In MU-MIMO, however, the channel quality at the respective receivers depends on the composition of the set of simultaneously scheduled users (i.e., receivers). This is due to that the disturbance from scheduled users may differ depending on which users are scheduled. Thus, the MSC determination is more cumbersome in this scenario.

Therefore, there is a need for link adaptation approaches for spatial multiplexing. Preferably, such link adaptation approaches are suitable for MU-MIMO. Also preferably, such link adaptation approaches provide improvements compared to prior art approaches. Improvement may be in any relevant form; e.g., increased throughput.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a link adaptation method for a transmitter node configured for spatial multiplexing of signals into streams and for transmission of spatially multiplexed streams over a forward channel, wherein each stream is intended for a receiver node.

The method comprises selecting a transmission pre-coding setting for at least one of the spatially multiplexed streams based on an acquired channel estimate of the forward channel, estimating a forward channel disturbance component, wherein the forward channel disturbance component includes signal distortion for the forward channel caused by at least one hardware component of the transmitter node and/or the receiver node, and performing link adaptation for at least one of the spatially multiplexed streams based on the selected transmission pre-coding setting and the estimated forward channel disturbance component.

In some embodiments, estimating the forward channel disturbance component comprises estimating a disturbance covariance matrix based on the selected transmission pre-coding setting, the acquired channel estimate of the forward channel, and a model of the signal distortion for the forward channel.

In some embodiments, the method further comprises acquiring the channel estimate of the forward channel by receiving a channel state estimate from the receiver node.

In some embodiments, the method further comprises acquiring the channel estimate of the forward channel by performing measurements on signals received from the receiver node over a reverse channel to determine a channel estimate of the reverse channel and using the channel estimate of the reverse channel as channel estimate of the forward channel.

In some embodiments, performing link adaptation comprises determining a signal-to-disturbance ratio for the forward channel based on the selected transmission pre-coding setting, the acquired channel estimate of the forward channel, a reception pre-coding setting of the receiver node, and the estimated forward channel disturbance component, and performing link adaptation based on the determined signal-to-disturbance ratio.

In some embodiments, performing link adaptation comprises selecting a modulation and coding scheme for the at least one of the spatially multiplexed streams.

In some embodiments, the signal distortion comprises one or more of: non-linear distortion of a power amplifier, non-linear distortion of a signal clipper, oscillator phase noise, non-linear distortion of a filter, and quantization noise of a digital-to-analog converter.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is a link adaptation apparatus for a transmitter node configured for spatial multiplexing of signals into streams and for transmission of spatially multiplexed streams over a forward channel, wherein each stream is intended for a receiver node.

The apparatus comprising controlling circuitry configured to cause selection of a transmission pre-coding setting for at least one of the spatially multiplexed streams based on an acquired channel estimate of the forward channel, estimation of a forward channel disturbance component, wherein the forward channel disturbance component includes signal distortion for the forward channel caused by at least one hardware component of the transmitter node and/or the receiver node, and performance of link adaptation for at least one of the spatially multiplexed streams based on the selected transmission pre-coding setting and the estimated forward channel disturbance component.

A fourth aspect is a transmitter node, such as a base station or an access point, comprising the apparatus of the third aspect.

In some embodiments, any of the above aspects may additionally have features identical with or corresponding to any of the various features as explained above for any of the other aspects.

An advantage of some embodiments is that link adaptation approaches for spatial multiplexing are provided.

An advantage of some embodiments is that the determined MCS matches the actual channel quality more accurately than for prior art approaches. This may lead to that communication resources are used more efficiently since they are not unnecessarily wasted (e.g., for re-transmissions if a MCS is selected that corresponds to a higher channel quality than the actual, and/or for over-cautious redundancy if a MCS is selected that corresponds to a lower channel quality than the actual).

An advantage of some embodiments is that the number of re-transmissions is decreased compared to prior art approaches.

An advantage of some embodiments is that the probability to accomplish the target decoding at the receiver is increased compared to prior art approaches.

An advantage of some embodiments is that communication resources are used more efficiently, potentially leading to higher throughput, compared to prior art approaches.

An advantage of some embodiments is that throughput is increased compared to prior art approaches.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As already mentioned, the channel quality at the respective receivers in MU-MIMO depends on the composition of the set of simultaneously scheduled users/receivers, and therefore, the link adaptation is not straight-forward in such scenarios.

Link adaptation techniques according to the prior art does not take into account the impact of radio-frequency (RF) hardware impairments. Thus, the link adaptation may become inaccurate. For example, a selected MCS may not accurately match to the actual link quality unless the RF hardware is ideal. This may lead to higher decoding error rates due to an overly optimistic choice of MCS indices, and/or to waste of communication resources due to an overly pessimistic choice of MCS indices.

In the following, embodiments will be described where link adaptation approaches for spatial multiplexing are provided. In some embodiments, the link adaptation approaches are suitable for MU-MIMO. In some embodiments, the link adaptation approaches provide improvements (e.g., one or more of: increased throughput, decreased decoding error rates, and improved use of communication resources) compared to prior art approaches. In some embodiments, the link adaptation approaches take RF hardware impairments into account.

Figure 1:
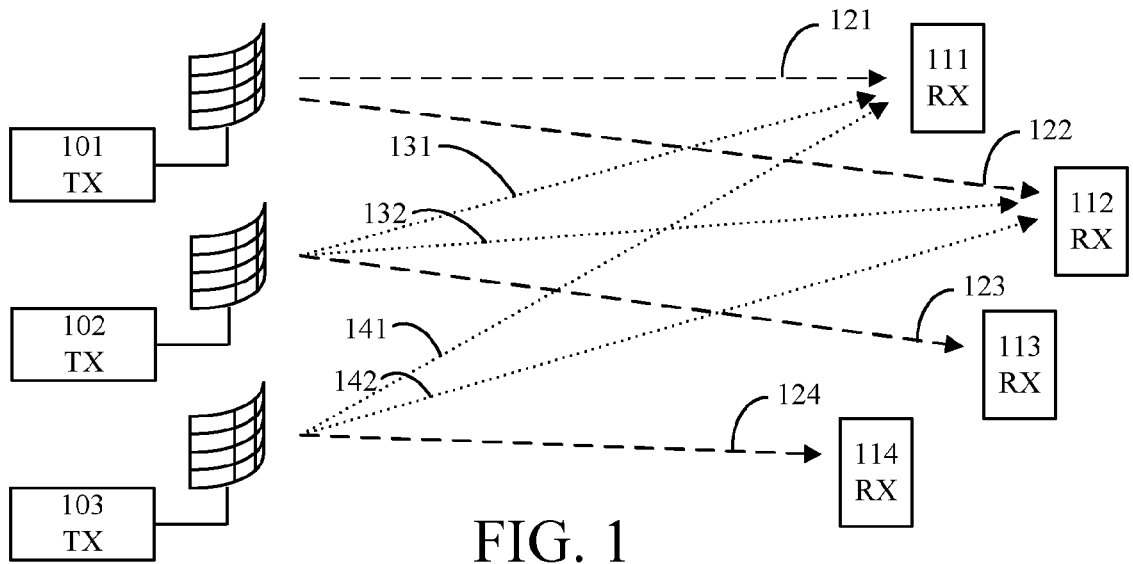
FIG. 1 is a schematic drawing illustrating an example scenario for some embodiments.

FIG. 1 schematically illustrates an example MU-MIMO scenario for some embodiments. In this scenario, there are three transmitter nodes (TX) 101, 102, 103, and four receiver nodes (RX) 111, 112, 113, 114. Each of the transmitter nodes are configured for spatial multiplexing of signals into streams and for transmission of spatially multiplexed streams over a forward channel, wherein each stream is intended for one of the receiver nodes.

Generally, spatial multiplexing of signals into streams and for transmission of spatially multiplexed streams may be accomplished via use of a plurality of antenna elements arranged in a multi-antenna structure (e.g., an antenna array or an antenna matrix).

In the example of FIG. 1, the transmitter node 101 transmits a stream to receiver node 111 over forward channel 121 and a stream to receiver node 112 over forward channel 122, the transmitter node 102 transmits a stream to receiver node 113 over forward channel 123, and the transmitter node 103 transmits a stream to receiver node 114 over forward channel 124.

The transmission by transmitter node 102 is experienced as disturbance at receiver nodes 111 and 112, as illustrated by 131 and 132, respectively, and the transmission by transmitter node 103 is experienced as disturbance at receiver nodes 111 and 112, as illustrated by 141 and 142, respectively.

Figure 2:
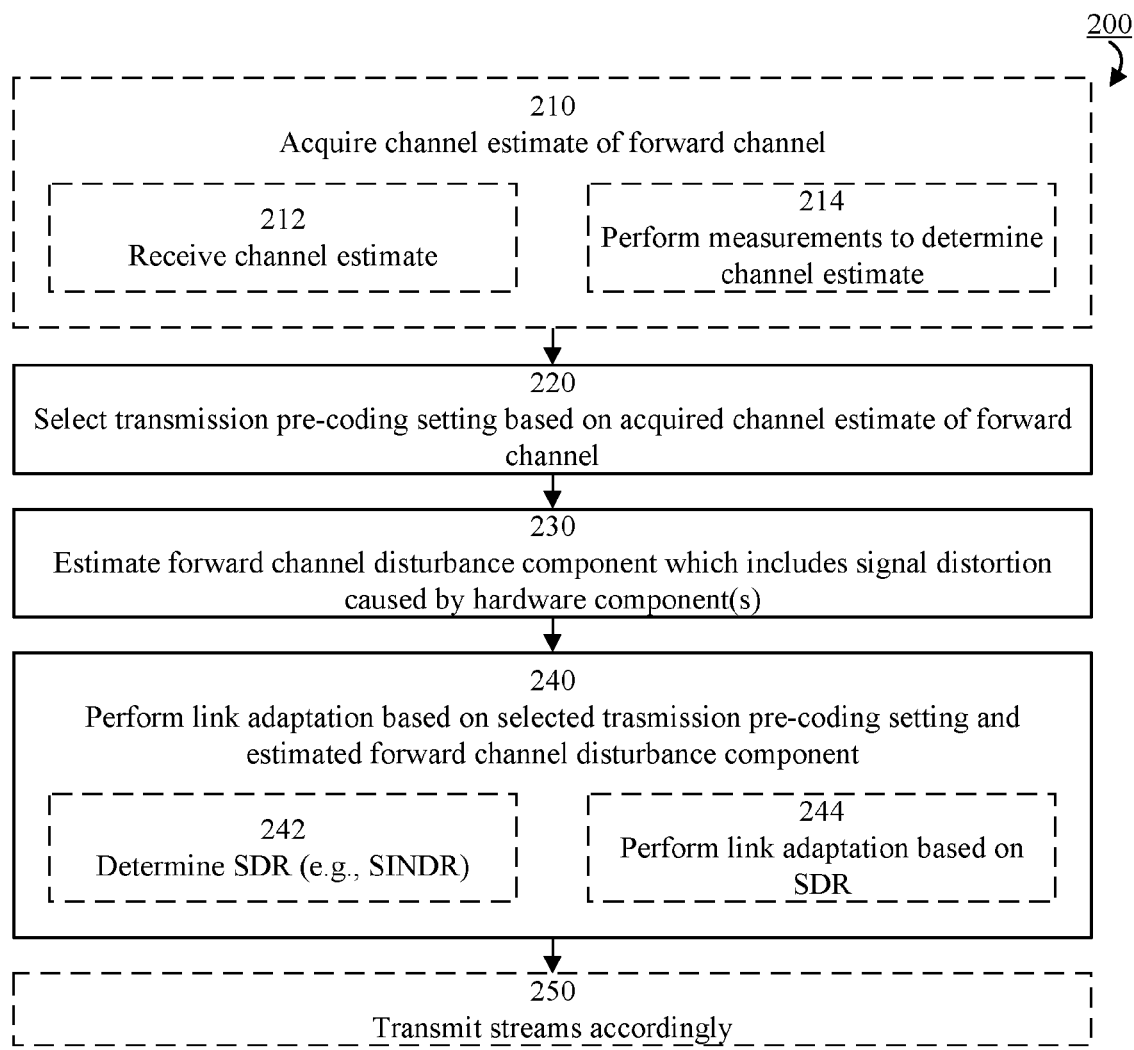
FIG. 2 is a flowchart illustrating example method steps according to some embodiments.

Generally, disturbance experienced at a receiver node may be in the form of one or more of: noise, interference, and distortion. Also generally, distortion may for example, comprise effects of hardware impairments of transmitter node(s) and/or receiver node(s). For example, distortion may comprise one or more of: non-linear distortion of a power amplifier, non-linear distortion of a signal clipper, oscillator phase noise, non-linear distortion of a filter, and quantization noise of a digital-to-analog converter FIG. 2 illustrates an example method 200 according to some embodiments. The method 200 is a link adaptation method for a transmitter node (e.g., any of the transmitter nodes 101, 102, 103 of FIG. 1) configured for spatial multiplexing of signals into streams and for transmission of spatially multiplexed streams over a forward channel, wherein each stream is intended for a receiver node.

In optional step 210, the transmitter node acquires a channel estimate of the forward channel. The acquisition may be via any suitable approach.

For example (particularly suitable for frequency division multiplexing—FDD), the transmitter node may acquire the channel estimate of the forward channel by receiving channel state information (CSI) from the receiver node, as illustrated in optional sub-step 212.

Alternatively or additionally (particularly suitable for time division multiplexing—TDD—with channel reciprocity), the transmitter node may acquire the channel estimate of the forward channel by performing measurements on signals received from the receiver node over a reverse channel to determine a channel estimate of the reverse channel, and using the channel estimate of the reverse channel as channel estimate of the forward channel, as illustrated in optional sub-step 214.

As an alternative to optional step 210, the transmitter node may be otherwise knowledgeable of (an estimate of) the forward channel.

In step 220, the transmitter node selects a transmission pre-coding setting for at least one of the spatially multiplexed streams based on an acquired channel estimate of the forward channel.

In step 230, the transmitter node estimates a forward channel disturbance component, wherein the forward channel disturbance component includes signal distortion for the forward channel caused by at least one hardware component of the transmitter node and/or the receiver node.

For example, estimating the forward channel disturbance component in step 230 may comprise estimating a disturbance covariance matrix based on the selected transmission pre-coding setting, the acquired channel estimate of the forward channel, and a model of the signal distortion for the forward channel.

The signal distortion typically relates to hardware impairments of the transmitter node and/or of the receiver node(s). For example, the signal distortion may comprise one or more of: non-linear distortion of a power amplifier, non-linear distortion of a signal clipper, oscillator phase noise, non-linear distortion of a filter, and quantization noise of a digital-to-analog converter.

In step 240, the transmitter node performs link adaptation (e.g., selects a modulation and coding scheme—MCS) for at least one of the spatially multiplexed streams based on the selected transmission pre-coding setting and the estimated forward channel disturbance component.

For example, performing the link adaptation in step 240 may comprise determining a signal-to-disturbance ratio (SDR) for the forward channel based on the selected transmission pre-coding setting, the acquired channel estimate of the forward channel, a reception pre-coding setting of the receiver node, and the estimated forward channel disturbance component (as illustrated in optional sub-step 242) and performing link adaptation based on the determined signal-to-disturbance ratio (as illustrated in optional sub-step 244).

When referred to herein, a signal-to-disturbance ratio (SDR) may, for example, comprise any of a signal-to-interference-noise-and-distortion ratio (SINDR), a signal-to-interference-and-distortion ratio, a signal-to-distortion ratio, a signal-to-interference ratio (SIR), a signal-to-noise ratio (SNR), and a signal-to-interference-and-noise ratio (SINR).

The method may also comprise transmitting the spatially multiplexed streams over the forward channel according to the selected transmission pre-coding setting of step 220 and the link adaptation of step 240, as illustrated by optional step 250.

It should be noted that, even though the method 200 has been described as entirely performed by the transmitter node, one or more steps of the method 200 may be performed by another node (e.g., a network node, such as another transmitter node or a server node) or distributedly performed by a plurality of nodes (which may or may not include the transmitter node.

Figure 3:
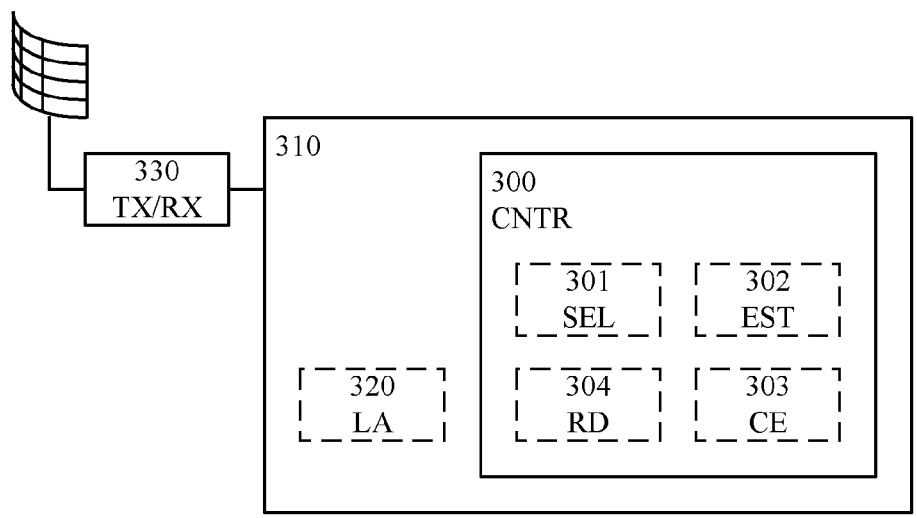
FIG. 3 is a schematic block diagram illustrating an example apparatus according to some embodiments.

FIG. 3 schematically illustrates an example apparatus 310 according to some embodiments. The apparatus 310 is a link adaptation apparatus for a transmitter node configured for spatial multiplexing of signals into streams and for transmission of spatially multiplexed streams over a forward channel, wherein each stream is intended for a receiver node.

The apparatus 310 may, for example, be comprisable (e.g., comprised) in a transmitter node, such as a base station or an access point. Alternatively or additionally, the apparatus 310 may be configured to cause performance of (e.g., may be configured to perform) one or more method steps as described in connection with FIG. 2, or otherwise described herein.

The apparatus comprises a controller (CNTR; e.g., controlling circuitry or a controlling module) 300.

The controller 300 is configured to cause selection of a transmission pre-coding setting for at least one of the spatially multiplexed streams based on an acquired channel estimate of the forward channel (compare with step 220 of FIG. 2).

To this end, the controller may comprise, or be otherwise associated with, a selector (SEL; e.g., selection circuitry or a selection module) 301. The selector may be configured to select the transmission pre-coding setting for at least one of the spatially multiplexed streams based on an acquired channel estimate of the forward channel.

The controller is also to cause estimation of a forward channel disturbance component, wherein the forward channel disturbance component includes signal distortion for the forward channel caused by at least one hardware component of the transmitter node and/or the receiver node (compare with step 230 of FIG. 2).

To this end, the controller may comprise, or be otherwise associated with, an estimator (EST; e.g., estimation circuitry or an estimation module) 302. The estimator may be configured to estimate the forward channel disturbance component.

For example, the controlling circuitry may be configured to cause the estimation of the forward channel disturbance component by causing estimation of a disturbance covariance matrix based on the selected transmission pre-coding setting, the acquired channel estimate of the forward channel, and a model of the signal distortion for the forward channel.

The controller is also to cause performance of link adaptation (e.g., selection of a modulation and coding scheme—MCS) for at least one of the spatially multiplexed streams based on the selected transmission pre-coding setting and the estimated forward channel disturbance component (compare with step 240 or FIG. 2).

To this end, the controller may comprise, or be otherwise associated with, a link adaptor (LA; e.g., link adaptation circuitry or a link adaptation module) 320. The link adaptor may be configured to perform the link adaptation for at least one of the spatially multiplexed streams based on the selected transmission pre-coding setting and the estimated forward channel disturbance component.

For example, the controlling circuitry may be configured to cause the performance of the link adaptation by causing determination of a signal-to-disturbance ratio for the forward channel based on the selected transmission pre-coding setting, the acquired channel estimate of the forward channel, a reception pre-coding setting of the receiver node, and the estimated forward channel disturbance component (compare with sub-step 242 of FIG. 2), and by causing performance of link adaptation based on the determined signal-to-disturbance ratio (compare with sub-step 244 of FIG. 2).

To this end, the controller may comprise, or be otherwise associated with, a ratio determiner (RD; e.g., ratio determination circuitry or a ratio determination module) 304. The ratio determiner may be configured to determine the signal-to-disturbance ratio for the forward channel.

In some embodiments, the controlling circuitry is also configured to cause acquisition of the channel estimate of the forward channel by reception of a channel state estimate from the receiver node (compare with step 210 of FIG. 2).

For example, the controlling circuitry may be configured to cause acquisition of the channel estimate of the forward channel by causing reception of a channel state estimate from the receiver node (compare with sub-step 212 of FIG. 2).

To this end, the controller may comprise, or be otherwise associated with, a receiver (RX; e.g., reception circuitry or a reception module), illustrated in FIG. 3 as part of a transceiver (TX/RX) 330. The receiver may be configured to receive the channel state estimate from the receiver node.

Alternatively or additionally, the controlling circuitry may be configured to cause acquisition the channel estimate of the forward channel by causing performance of measurements on signals received from the receiver node over a reverse channel to determine a channel estimate of the reverse channel, and use of the channel estimate of the reverse channel as channel estimate of the forward channel (compare with sub-step 214 of FIG. 2).

To this end, the controller may comprise, or be otherwise associated with, a receiver (RX; e.g., reception circuitry or a reception module), illustrated in FIG. 3 as part of a transceiver (TX/RX) 330. The receiver may be configured to receive the signals from the receiver node over the reverse channel.

Also to this end, the controller may comprise, or be otherwise associated with, a channel estimator (CE; e.g., channel estimation circuitry or a channel estimation module) 303. The channel estimator may be configured to estimate the forward channel by determining a channel estimate of the reverse channel based on measurements on signals received from the receiver node over the reverse channel, and using of the channel estimate of the reverse channel as channel estimate of the forward channel.

Figure 5:
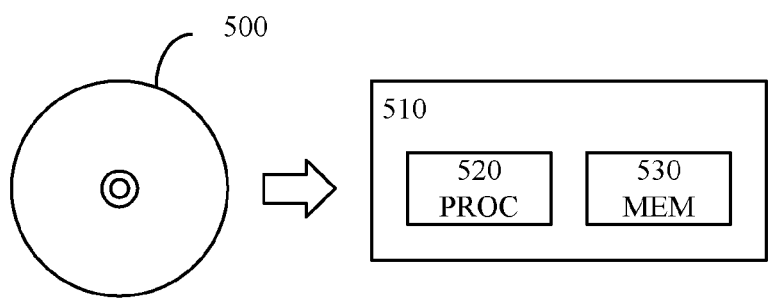
FIG. 5 is a schematic drawing illustrating an example computer readable medium according to some embodiments.

In some embodiments, the controlling circuitry is also configured to cause transmission of the spatially multiplexed streams over the forward channel according to the selected transmission pre-coding setting and the link adaptation (compare with step 250 of FIG. 5).

To this end, the controller may comprise, or be otherwise associated with, a transmitter (TX; e.g., transmission circuitry or a transmission module), illustrated in FIG. 3 as part of a transceiver (TX/RX) 330. The transmitter may be configured to transmit the spatially multiplexed streams over the forward channel.

It should be noted that, even if this description focuses on downlink (DL) transmission wherein the transmitter node is an access node (e.g., a base station—BS, e.g., eNB—or an access point—AP), embodiments may be equally applicable for uplink (UL) transmission wherein the transmitter node is a user device (e.g., a user equipment—UE).

An example implementation will now be described to further illustrate the method of FIG. 2 and/or the apparatus of FIG. 3. In this example, there are $K_{TX}$ transmitter nodes (e.g., 101, 102, 103 of FIG. 1 where $K_{TX}=3$) and $K_{TX}$ receivers (e.g., 111, 112, 113, 114 of FIG. 1 where $K_{RX}=4$). Each transmitter node intends to communicate D streams to an intended receiver node, and will thereby cause interference to the other receiver nodes. In such a setup, the link adaptation approach proposed herein may be exemplified as follows.

The transmitter node acquires a DL channel estimate $\hat{H}_{kj}$ (between transmitter node j and receiver node k). As elaborated on earlier, this may be achieved, for example, by reception of CSI reports from the reception nodes or by exploiting channel reciprocity (compare with step 210 of FIG. 2).

Then, transmitter node j (j=1, . . . , $K_{TX}$ determines (e.g., computes) beamforming vectors $v_j^d$ corresponding to stream d (d=1, . . . , D). This may be seen as an example of selection of transmission pre-coding setting (compare with step 220 of FIG. 2). The beamforming vectors may be determined according to any suitable approach.

Determining the transmission pre-coding setting may, for example, be implemented using linear pre-coding (e.g., conjugate beamforming, zero-forcing beamforming, or minimum mean square error beamforming) or non-linear pre-coding (e.g., Tomlinson-Harashima pre-coding, or vector pre-coding).

Alternatively or additionally, determining the transmission pre-coding setting may be implemented using an iterative approach for finding an acceptable pre-coding setting.

Returning to the example implementation for link adaptation, an estimate of the $K_{TX} \times K_{TX}$ transmit distortion covariance matrix, denoted by $Q_{ee,j}$, is determined (e.g., computed) at transmitter j based on estimated parameters (e.g., one or more of: the channel estimate $\hat{H}_{kj}$, the beamforming vectors $v_j^d$, and model parameters of hardware impairments such as oscillator phase noise, phase-locked loop coefficients, power amplifier polynomial, digital-to-analog converter resolution, etc.). For example, the transmit distortion covariance matrix may be determined as proposed in any of the following references:

S. Jacobsson, G. Durisi, M. Coldrey, and C. Studer, "Linear precoding with low-resolution DACs for massive MU-MIMO-OFDM downlink," IEEE Trans. Wireless Commun., vol. 18, no. 3, pp. 1595-1609, March 2019—for distortion due to quantization.

A. Mezghani and J. A. Nossek, "Capacity lower bound of MIMO channels with output quantization and correlated noise," in IEEE Int. Symp. Inf. Theory (ISIT), Cambridge, MA, USA, July 2012—for distortion due to quantization.

C. Mollén, U. Gustavsson, T. Eriksson, and E. G. Larsson, "Spatial characteristics of distortion radiated from antenna arrays with transceiver nonlinearities," IEEE Trans. Wireless Commun., vol. 17, no. 10, pp. 6663-6679, October 2018—for distortion due to nonlinear power amplifier.

N. N. Moghadam, G. Fodor, M. Bengtsson, and D. J. Love, "On the energy efficiency of MIMO hybrid beamforming for millimeter-wave systems with nonlinear power amplifiers," IEEE Trans. Wireless Commun., vol. 17, no. 11, pp. 7208-7221, November 2018—for distortion due to nonlinear power amplifier.

S. Jacobsson, U. Gustavsson, G. Durisi, and C. Studer, "Massive MU-MIMO-OFDM uplink with hard-ware impairments: Modeling and analysis," in Proc. Asilomar Conf. Signals, Syst., Comput., Pacific Grove, CA, USA, October 2018, pp. 1829-1835—for distortion due to combined effect of nonlinear power amplifier, phase noise, and quantization.

An interference and distortion covariance estimate $Q_k^l$ (an example of a disturbance covariance matrix) corresponding to the $l^{th}$ stream to the $k^{th}$ receiver node is estimated at the transmitter node based on the transmit distortion covariance matrix. The interference and distortion covariance estimate includes the impact of inter-user interference and also the self and inter-user interference due to RF hardware impairments. For example, the covariance matrix may be given by:

$$Q_k^l = \sum_{j=1}^{K_{TX}} \sum_{d=1}^{D} p_j^d \hat{H}_{kj} v_j^d (v_j^d)^* (\hat{H}_{kj})^* - p_k^l \hat{H}_{kk} v_k^l (v_k^l)^* (\hat{H}_{kk})^* + \sum_{j=1}^{K_{TX}} \hat{H}_{kj} Q_{ee,j} (\hat{H}_{kj})^*,$$

where $p_j^d$ is the transmission power corresponding to stream d of transmitter node j, the first term represents mutual influence among all streams, the second term represents removal of the desired stream such that only mutual interference among all streams remain, and the last term represents distortion due to hardware impairments.

Either or both of the transmit distortion covariance matrix (e.g., $Q_{ee,j}$) and the interference and distortion covariance estimate (e.g., $Q_k^l$) may be seen as examples of the forward channel disturbance component estimated in step 230 of FIG. 2, wherein the transmit distortion covariance matrix accounts for signal distortion for the forward channel caused by at least one hardware component of the transmitter node and/or the receiver node.

The effective forward channel corresponding to pre-coder $v_j^d$ and channel estimate $\hat{H}_{kj}$ is then used together with the interference and distortion covariance estimate $Q_k^l$ to calculate the expected SINDR for the $l^{th}$ stream as experienced at the receiver node k (compare with step 242 of FIG. 2). For example, the SINDR may be computed as:

$$SINDR_k^l = \frac{|(u_k^l)^* \hat{H}_{kk} v_k^l|^2}{(u_k^l)^* Q_k^l u_k^l + \sigma^2},$$

where $u_k^l$ is the receive filter corresponding to the $l^{th}$ stream at the $k^{th}$ receiver node, and $\sigma^2$ is the noise power at the receiver node.

The SINDR for each stream can then be used to determine a modulation and coding scheme (MCS) index for the corresponding stream (compare with step 244 of FIG. 2).

It should be noted that, even though the above example implementation is described in the form of a certain combination of calculations, one or more of the individual calculations may be applied (e.g., in a corresponding step of the method 200 of FIG. 2) without application of all of the other calculations. For example, the SINDR computation of the example implementation may be used together with another distortion covariance estimate, and vice versa.

Figure 4:
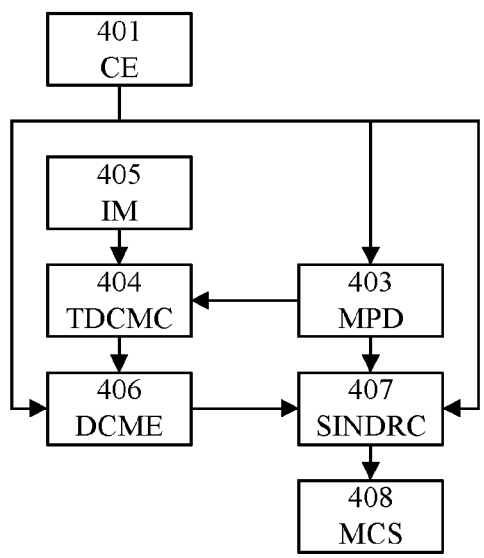
FIG. 4 is a schematic block diagram illustrating example functional blocks according to some embodiments.

FIG. 4 schematically illustrates example functional blocks for link adaptation of a transmitter node configured for spatial multiplexing of signals into streams and for transmission of spatially multiplexed streams over a forward channel, wherein each stream is intended for a receiver node.

One or more of the functional blocks may be comprisable (e.g., comprised) in a transmitter node, such as a base station or an access point. Alternatively or additionally, the functional blocks may be configured to cause performance of (e.g., may be configured to perform) one or more method steps as described in connection with FIG. 2, or otherwise described herein.

Each functional block may, for example, be implemented by functional circuitry (i.e., functional hardware) and/or by functional modules (i.e., functional software).

The functional blocks of FIG. 4 may be seen as an alternative to, or an exemplification of, the apparatus 310 of FIG. 3.

The functional block 401 implements channel estimation (CE). The functional block 401 is configured to acquire a channel estimate of the forward channel (compare with step 210 of FIG. 2). The channel estimate of the forward channel may be acquired by receiving channel state information from the receiver node, and/or by utilizing channel reciprocity (performing measurements for a reverse channel to determine a channel estimate of the reverse channel, and using the channel estimate of the reverse channel as channel estimate of the forward channel). The functional block 401 may also be configured to determine an interference covariance matrix (e.g., $\hat{H}_{kj}$).

The functional block 403 implements transmit precoding matrix design (MPD). The functional block 403 is configured to select a transmission pre-coding setting (beamforming vector $v_j^d$) for at least one of the spatially multiplexed streams based on the channel estimate of block 401 (compare with step 220 of FIG. 2).

The functional block 405 implements an impairment model (IM) of the hardware impairments. The functional block 405 may implement any suitable impairment model; e.g., a polynomial model (wherein, for example, one or more of the third, fifth, etc. order distortion component may be used as an approximation).

The functional block 404 implements transmit distortion covariance matrix computation (TDCMC), which is an example of forward channel disturbance component estimation (compare with step 230 of FIG. 2). The functional block 404 is configured to calculate a transmit distortion covariance matrix (e.g., $Q_{ee,j}$) based on the transmission pre-coding setting of block 403 and the impairment model of block 405.

The functional block 406 implements disturbance covariance matrix estimation (DCME), which is an example of forward channel disturbance component estimation (compare with step 230 of FIG. 2). The functional block 406 is configured to estimate a disturbance covariance matrix (e.g., $Q_k^l$) based on the transmit distortion covariance matrix of block 404 and the channel estimate of block 401.

The functional block 407 implements SINDR calculation (SINDR), which is an example of determining a signal-to-disturbance ratio (compare with sub-step 242 of FIG. 2). The functional block 407 is configured to calculate SINDR based on the disturbance covariance matrix of block 406, the transmission pre-coding setting of block 403, and the channel estimate of block 401.

The functional block 408 implements selection of modulation and coding scheme (MCS), which is an example of link adaptation (compare with step 240 of FIG. 2). The functional block 408 is configured to select MCS based on the SINDR of block 407.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node (e.g., a base station or an access point).

Embodiments may appear within an electronic apparatus (such as a network node; e.g., a base station or an access point) comprising arrangements, circuitry, and/or logic according to any of the embodiments described herein. Alternatively or additionally, an electronic apparatus (such as a network node; e.g., a base station or an access point) may be configured to perform methods according to any of the embodiments described herein.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC; e.g., data processing circuitry or a data processing unit) 520, which may, for example, be comprised in a network node 510.

When loaded into the data processor, the computer program may be stored in a memory (MEM) 530 associated with or comprised in the data processor. According to some embodiments, the computer program may, when loaded into and run by the data processor, cause execution of method steps according to, for example, any of the methods illustrated in FIG. 2 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A link adaptation method for a transmitter node configured for spatial multiplexing of signals into streams and for transmission of spatially multiplexed streams over one or more forward channels including a first forward channel, wherein each stream is intended for a receiver node, the method comprising:
    selecting a transmission pre-coding setting for at least one of the spatially multiplexed streams based on an acquired channel estimate of the first forward channel;
    based on the selected transmission pre-coding setting, estimating a forward channel disturbance component, wherein the forward channel disturbance component includes signal distortion for the first forward channel caused by at least one hardware component of the transmitter node and/or the receiver node; and
    performing link adaptation for at least one of the spatially multiplexed streams based on the selected transmission pre-coding setting and the estimated forward channel disturbance component, wherein
    estimating the forward channel disturbance component comprises estimating a disturbance covariance matrix based on the selected transmission pre-coding setting, the acquired channel estimate of the first forward channel, and a model of the signal distortion for the first forward channel.

2. The method of claim 1, further comprising acquiring the channel estimate of the first forward channel by receiving a channel state estimate from the receiver node.

3. The method of claim 1, further comprising acquiring the channel estimate of the first forward channel by performing measurements on signals received from the receiver node over a reverse channel to determine a channel estimate of the reverse channel and using the channel estimate of the reverse channel as channel estimate of the first forward channel.

4. The method of claim 1, wherein performing link adaptation comprises:
    determining a signal-to-disturbance ratio for the first forward channel based on the selected transmission pre-coding setting, the acquired channel estimate of the first forward channel, a reception pre-coding setting of the receiver node, and the estimated forward channel disturbance component; and
    performing link adaptation based on the determined signal-to-disturbance ratio.

5. The method of claim 1, wherein performing link adaptation comprises selecting a modulation and coding scheme for the at least one of the spatially multiplexed streams.

6. The method of claim 1, wherein the signal distortion comprises one or more of: non-linear distortion of a power amplifier, non-linear distortion of a signal clipper, oscillator phase noise, non-linear distortion of a filter, and quantization noise of a digital-to-analog converter.

7. The method of claim 1, wherein performing link adaptation comprises:
  determining a signal-to-disturbance ratio for the first forward channel based on one or more of: the selected transmission pre-coding setting, the acquired channel estimate of the first forward channel, a reception pre-coding setting of the receiver node, and the estimated forward channel disturbance component; and
  performing link adaptation based on the determined signal-to-disturbance ratio.

8. A computer program product comprising a non-transitory computer readable medium having a computer program comprising program instructions, the computer program being loadable into a data processing unit and configured to cause execution of the method of claim 1 when the computer program is run by the data processing unit.

9. A link adaptation apparatus for a transmitter node configured for spatial multiplexing of signals into streams and for transmission of spatially multiplexed streams over one or more forward channels including a first forward channel, wherein each stream is intended for a receiver node, the apparatus comprising controlling circuitry configured to cause:
  selection of a transmission pre-coding setting for at least one of the spatially multiplexed streams based on an acquired channel estimate of the first forward channel;
  estimation of a forward channel disturbance component based on the selected transmission pre-coding setting, wherein the forward channel disturbance component includes signal distortion for the first forward channel caused by at least one hardware component of the transmitter node and/or the receiver node; and
  performance of link adaptation for at least one of the spatially multiplexed streams based on the selected transmission pre-coding setting and the estimated forward channel disturbance component, wherein
  the controlling circuitry is configured to cause the estimation of the forward channel disturbance component by causing estimation of a disturbance covariance matrix based on the selected transmission pre-coding setting, the acquired channel estimate of the first forward channel, and a model of the signal distortion for the first forward channel.

10. The apparatus of claim 9, wherein the controlling circuitry is further configured to cause acquisition of the channel estimate of the first forward channel by reception of a channel state estimate from the receiver node.

11. The apparatus of claim 9, wherein the controlling circuitry is further configured to cause acquisition of the channel estimate of the first forward channel by performance of measurements on signals received from the receiver node over a reverse channel to determine a channel estimate of the reverse channel and use of the channel estimate of the reverse channel as channel estimate of the first forward channel.

12. The apparatus of claim 9, wherein the controlling circuitry is configured to cause the performance of the link adaptation by causing:
  determination of a signal-to-disturbance ratio for the first forward channel based on the selected transmission pre-coding setting, the acquired channel estimate of the first forward channel, a reception pre-coding setting of the receiver node, and the estimated forward channel disturbance component; and
  performance of link adaptation based on the determined signal-to-disturbance ratio.

13. The apparatus of claim 9, wherein the controlling circuitry is configured to cause the performance of the link adaptation by causing selection of a modulation and coding scheme for the at least one of the spatially multiplexed streams.

14. The apparatus of claim 9, wherein the signal distortion comprises one or more of: non-linear distortion of a power amplifier, non-linear distortion of a signal clipper, oscillator phase noise, non-linear distortion of a filter, and quantization noise of a digital-to-analog converter.

15. The apparatus of claim 9, wherein the controlling circuitry is configured to cause the performance of the link adaptation by causing:
  determination of a signal-to-disturbance ratio for the first forward channel based on one or more of: the selected transmission pre-coding setting, the acquired channel estimate of the first forward channel, a reception pre-coding setting of the receiver node, and the estimated forward channel disturbance component; and
  performance of link adaptation based on the determined signal-to-disturbance ratio.

16. A transmitter node, such as a base station or an access point, comprising the apparatus of claim 9.

* * * * *